J. W. BARD AND O. WHITE.
GRAPHIC RECORDING INSTRUMENT.
APPLICATION FILED OCT. 14, 1916.
1,350,485.
Patented Aug. 24, 1920.
3 SHEETS—SHEET 1.
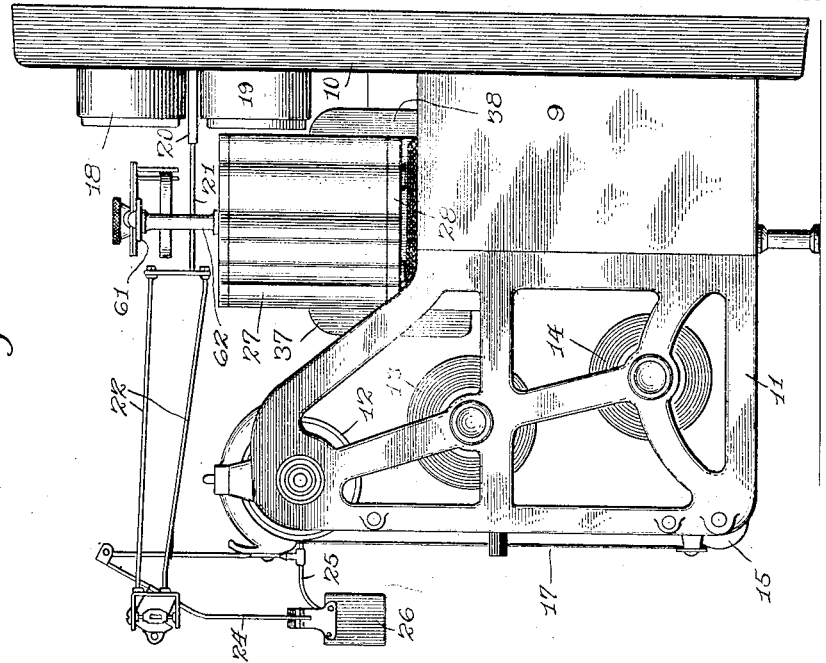
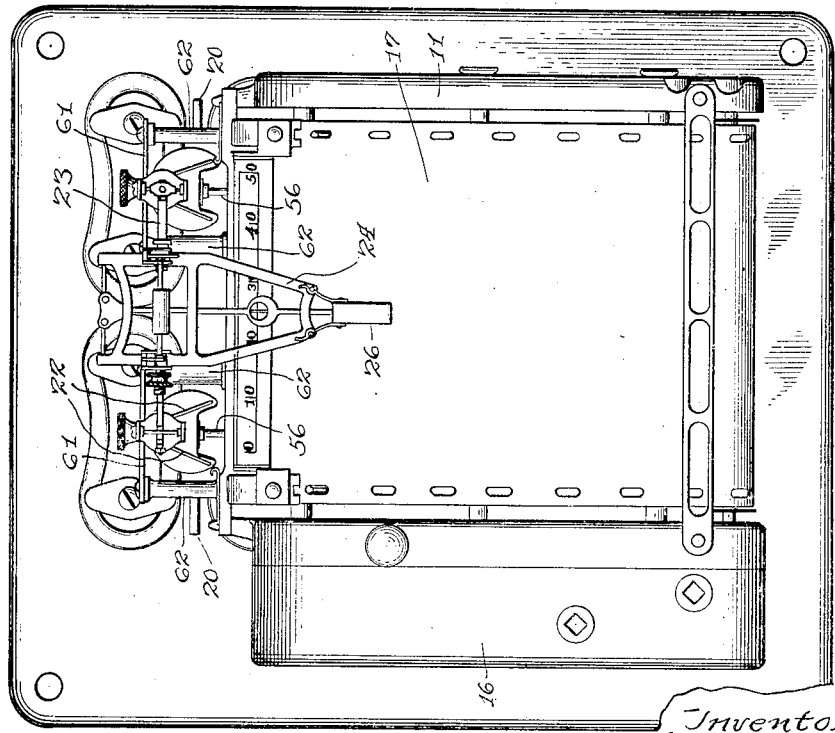
Witness
L. B. Graham
Inventors
Jacob W. Bard
Otis White

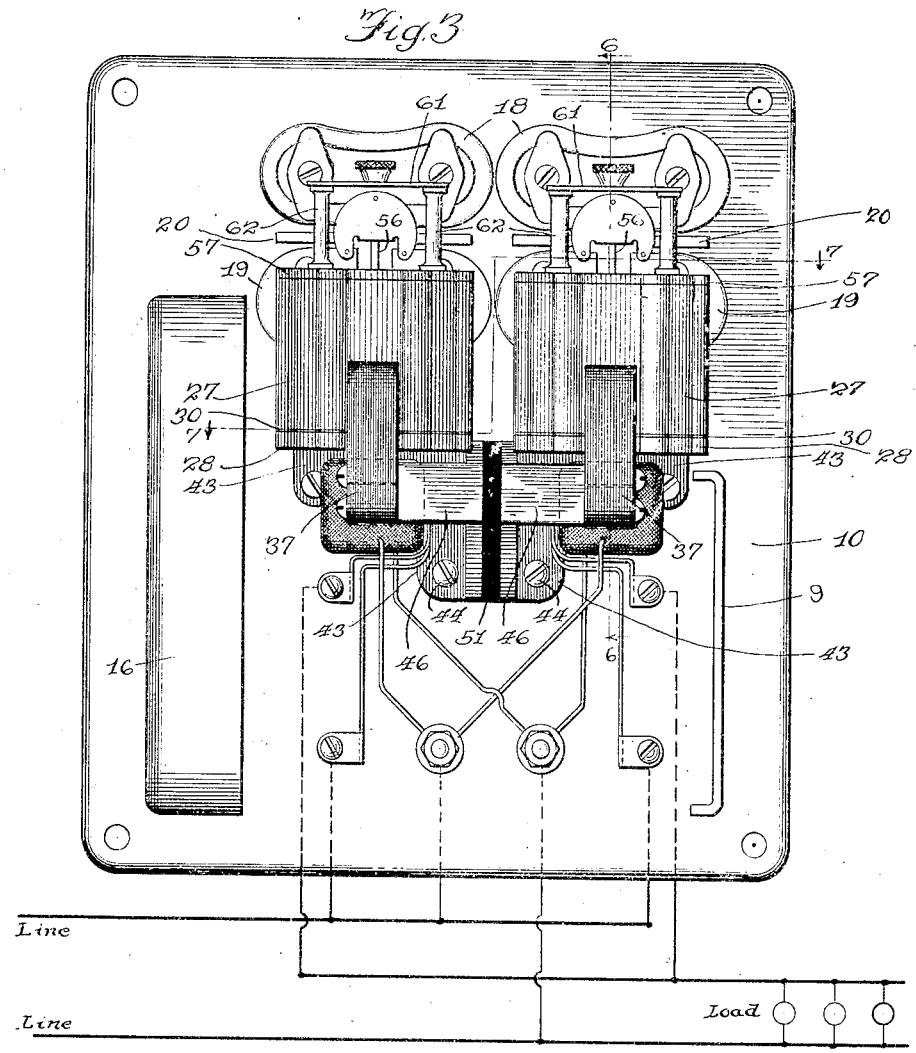
J. W. BARD AND O. WHITE.
GRAPHIC RECORDING INSTRUMENT.
APPLICATION FILED OCT. 14, 1916.
1,350,485.　　Patented Aug. 24, 1920.
3 SHEETS—SHEET 2.
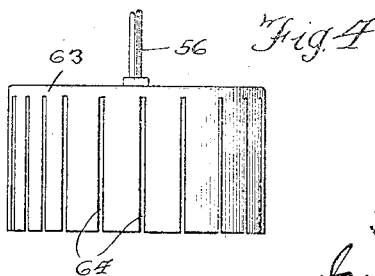

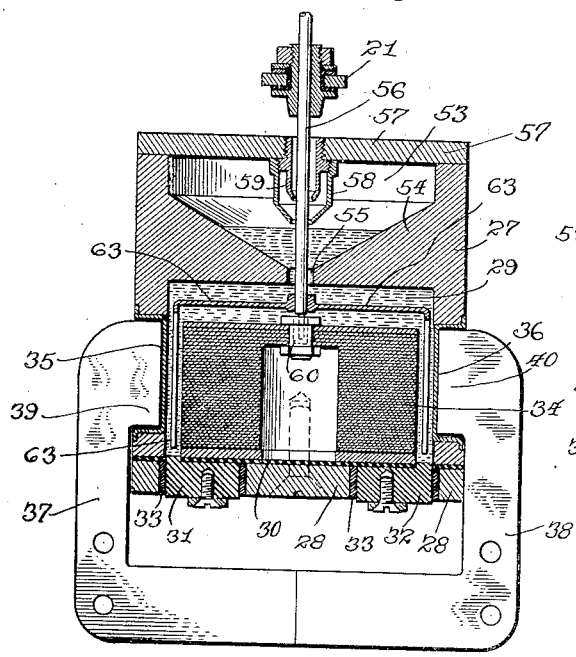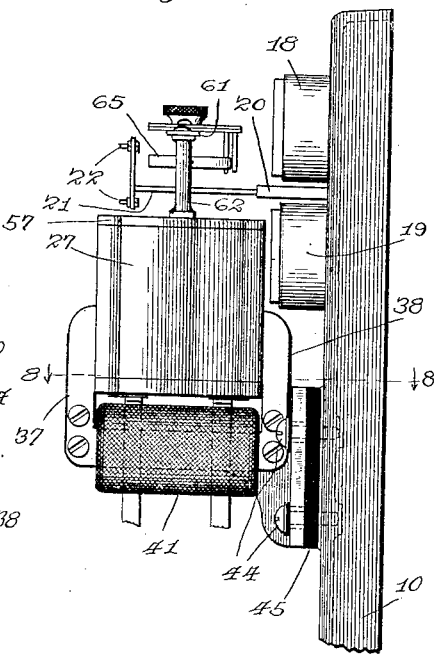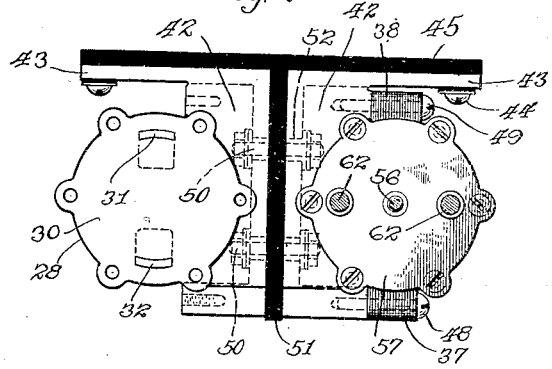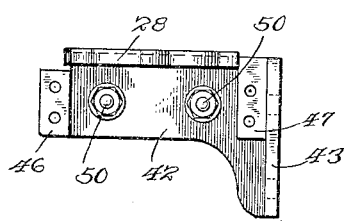

UNITED STATES PATENT OFFICE.

JACOB W. BARD AND OTIS WHITE, OF SPRINGFIELD, ILLINOIS, ASSIGNORS TO SANGAMO ELECTRIC COMPANY, OF SPRINGFIELD, ILLINOIS, A CORPORATION OF ILLINOIS.

GRAPHIC RECORDING INSTRUMENT.

1,350,485.     Specification of Letters Patent.     Patented Aug. 24, 1920.

Application filed October 14, 1916. Serial No. 125,728.

*To all whom it may concern:*

Be it known that we, JACOB W. BARD and OTIS WHITE, citizens of the United States, and residents of Springfield, in the county of Sangamon and State of Illinois, have invented certain new and useful Improvements in Graphic Recording Instruments, of which the following is a specification, reference being had to the accompanying drawings.

Our invention relates to electrically-operated graphic recording instruments of the general type shown and described in Letters Patent to Robert C. Lanphier, No. 992,010, granted May 9, 1911, in which variations in pressure or quantity of force are recorded by means of a pen or pencil upon a moving chart driven by chronometrically-controlled motor mechanism independent of the force which controls the movement of the pen. Our present invention is not concerned with the devices for supporting and moving the chart, as any suitable mechanism for the purpose may be used, provided it is susceptible of association and coöperation with pen-supporting devices adapted to be operated by the electric motor mechanism which forms the subject-matter of the present application, as hereinafter pointed out.

In the instrument shown and described in said Lanphier patent the pen is carried by a swinging support moved in one direction by electrically-operated motor devices to carry the pen transversely across the face of the chart against the opposition of springs which tend to return the pen to its normal position,—the line traced by the pen varying in accordance with the variations or fluctuations of the actuating current. The pen-supporting devices comprise two horizontally-swinging arms carried by the armature shafts of two similar mercury motor elements, the outer ends of said arms being connected by a cross-bar or link so that they swing in parallelism, and the pen being supported by such cross-bar. The springs which return the pen to its normal or neutral position are mounted upon the armature shafts. Our present invention has to do with the electrically-operated motor elements by which fluctuations or variations of the operating electric current are communicated to a swinging pen-carrying frame or support of the general character above referred to, and in the accompanying drawings we have shown our invention applied to a graphic recording instrument having pen-supporting devices constructed and operating in the manner shown and described in an application for patent filed of even date herewith as the joint invention of Otis White (one of the present applicants) and John Kremer, Serial No. 125,731. The recording instrument shown is also provided with a removable chart-carrying frame having the construction shown and described in an application for patent filed of even date herewith as the joint invention of said Otis White and Herbert W. Young, Serial No. 125,730, and having a housing adapted to contain chart-moving mechanism like that shown and described in an application filed of even date herewith by said Otis White, Serial No. 125,733. The recording instrument illustrated is also equipped with damping magnets constructed and arranged as described in an application filed of even date herewith by Robert C. Lanphier, Serial No. 125,726.

The object of our present invention is to provide certain improvements in the electrically-operated motor elements referred to by which the maximum torque for a given current flow and field strength may be obtained; by which the pen system comprising the swinging pen support, the pen, the ink reservoir by which it is supplied, and the counterbalance weights carried by the pen support, may be buoyantly supported so as to be very sensitive to fluctuations in the actuating current; by which the length of the air gaps in the magnetic circuit may be materially reduced; and by which the assemblage of the parts may readily be effected. We accomplish this object as illustrated in the drawings and as hereinafter described. That which we believe to be new is set forth in the claims.

In the accompanying drawings,—

Figure 1 is a front view of a graphic recording instrument of the type referred to;

Fig. 2 is a side view thereof;

Fig. 3 is a front elevation, the chart-supporting frame being removed;

Fig. 4 is an elevation of the armature of one of the motor elements;

Fig. 5 is a side view of the parts shown in Fig. 3;

Fig. 6 is an enlarged vertical section on line 6—6 of Fig. 3, showing the interior construction of one of the motor elements;

Fig. 7 is a partial horizontal section on line 7—7 of Fig. 3; and

Fig. 8 is a side view of one of the motor element supporting brackets.

Referring to the drawings,—

The general construction of the recording instrument shown is fully set forth in the several applications hereinbefore referred to and therefore need not be described in detail herein. It will suffice to say that as shown in Figs. 1 and 2 the instrument comprises a base 9 having a back-plate 10 adapted to be secured to a switch-board or other suitable support, said base carrying a chart-holding frame 11 removable in a forward direction, said frame having a rotary platen 12, a feed-roller 13, a rewinding-roller 14 upon which the chart is rewound after use, and a guide-roller 15. At one side of the chart-holding frame 11 is a housing 16 in which is mounted chronometrically-controlled motor mechanism for driving the platen 12 and with it the chart 17. Mounted upon the back-plate 10 are damping magnets 18—19 arranged in pairs and coöperating with counterbalance weights 20 of copper or other suitable material, which are carried at the rear ends of horizontally-swinging arms 21 connected with the armature shafts of the electrically-operated motor elements hereinafter described. Said arms carry at their forward ends parallel frames 22 connected at the front by a cross-bar 23 upon which is mounted a pen-carrying frame 24. The latter frame carries a pen in the form of a capillary tube 25, which receives its supply of ink from an inkwell 26 and is adapted to make a record on the chart 17.

Coming now to the devices which embody the invention forming the subject-matter of the present application,—27 indicates the casings of two motor elements, which are alike in all respects, and therefor the same reference numbers will be used to designate the corresponding parts thereof. Each of the casings 27 is made of suitable non-conducting material and has the internal construction best shown in Fig. 6. As therein shown, the lower portion of the casing is in the form of a cylinder open at its lower end, the lower end of the casing resting upon a bottom-plate 28, which may be of any suitable material and is insulated from the interior of the casing, which forms a deep mercury chamber 29. For securing such insulation a disk 30 of paper or other suitable material is placed between the plate 28 and the lower margin of the casing 27. 31—32 indicate oppositely-disposed copper contact plates, which are fitted in the bottom-plate 28 and extend therethrough so as to make contact with the mercury in the mercury chamber 29, said contact plates being insulated from the bottom-plate 28 by insulating material 33. 34 indicates a laminated iron return-plate for the magnetic lines of force, as hereinafter explained. Said return-plate is of somewhat smaller diameter than the interior of the mercury chamber 29 and is supported by and secured to the bottom-plate 28, being insulated from said bottom-plate and the contact plates 31—32 by the paper disk 30, as shown in Fig. 6. 35—36 indicate two oppositely-disposed soft steel plates, which are inset in slots provided in the casing 27 at diametrically-opposite sides of the mercury chamber adjacent to the contacts 31—32, said plates 35—36 being tightly secured to the casing so as to prevent leakage around them. As shown, the inner surfaces of said plates are exposed to contact with the mercury in the mercury chamber. 37—38 indicate two laminated soft iron members, which together form the yoke of an electro-magnet, the poles 39—40 of which fit into the sockets formed by the plates 35—36, as shown in said figure. This soft iron yoke is adapted to receive a shunt or a series coil 41, depending on whether or not the apparatus is intended for use with a direct or an alternating current. By providing the soft steel plates 35—36 inset in the casing 27, and fitting the poles 39—40 of the electromagnetic yoke in the sockets thereby formed, it will be apparent that the length of the air gaps in the magnetic circuit is very materially reduced, and consequently the sensitiveness of the instrument is increased. The members 37—38 of the yoke, together with the casing 27, are supported as best shown in Figs. 5, 7 and 8. As therein shown, each of the motor elements is supported by a bracket 42 having a vertical plate 43 adapted to be secured to the back-plate 10 by screws 44, as shown in Fig. 5, being insulated therefrom by an insulating plate 45. The bracket 42 carries the bottom-plate 28 of the motor element supported by it, said bottom-plate being preferably formed integral with the bracket. Said bracket is also provided with bosses 46—47 at diametrically-opposite points, against which the members 37—38 of the yoke fit and to which they are secured by screws 48—49. Thus the members of the yoke are firmly held in position, but they may readily be removed by removing the screws 48—49. The brackets supporting the two casings 27 are firmly secured together by bolts 50 which pass through them and through an insulating plate 51 placed between them, as shown in Fig. 7, said bolts being properly insulated from the bracket, as indicated in dotted lines at 52 in Fig. 7. The bolts 50 are easily accessible when the members 37—38 of the yoke have been removed.

53 indicates a supplemental mercury chamber provided in the casing 27 above the mercury chamber 29 and separated therefrom by a partition 54, the upper surface of which is funnel shaped, as illustrated in Fig. 6. The partition 54 is provided with an axial opening 55 for the passage of an armature shaft 56 and to permit mercury to flow from one of said chambers to the other. 57 indicates a cover-plate for the auxiliary chamber 53, said cover-plate being provided with suitable means to prevent the mercury from spilling when the casing is upset. Preferably, a device comprising a plurality of nipples 58—59, as shown and described in Letters Patent No. 1,226,956 granted to A. L. Emens May 22, 1917, is used. Any other suitable device for the purpose may, however, be employed.

The lower end of the armature shaft 56 is stepped in a jewel bearing 60 provided in the return-plate 34, and its upper end is fitted in a suitable bearing carried by a cross-bar 61 mounted on pillars 62 supported by the cover-plate 57, as shown in Figs. 3 and 7. Carried by the armature shaft 56 near its lower end is a cup-shaped armature 63, the construction of which is best shown in Figs. 4 and 6. Said armature is a thin plate of copper amalgamated on its surfaces and mounted in an inverted position within the mercury chamber 29, which by reason of the presence of the return-plate 34 conforms in shape to the shape of the armature. Said armature is provided with a series of slits 64 in its vertical or marginal portion, said slits extending from the lower edge of the armature approximately to the horizontal portion thereof. The purpose of employing a cylindrical slitted armature is to secure the maximum torque for a given current flow and field strength. By employing an armature having a marginal portion extending vertically into the mercury in a correspondingly - shaped mercury chamber the resulting buoyancy serves to balance the weight of the pen system and the supporting devices therefor, and consequently the apparatus responds much more sensitively to slight variations in the actuating current.

It will be understood that according to the principles governing the operation of mercury motor meters the passage of current through the armatures of the two motor elements and through the series of shunt coils, will have the effect of rotating the armature shafts, consequently swinging the pen transversely of the chart. This action is opposed by springs 65 mounted on the armature shafts, tending to hold the pen in its normal position, as fully explained in the Lanphier patent hereinbefore referred to. Consequently the pen system is caused to oscillate to correspond with variations or fluctuations in the actuating current, all such oscillations being recorded on the chart. In a graphic recording instrument operated by direct current shunt coils are carried on the two yokes, while in an instrument operated by alternating current series coils are carried on said yokes, and in the latter case, in practice, the current through each armature is obtained from a suitable step-down transformer having its primary connected across the line at 110 or 220 volts, and its secondary of one or two turns delivering a comparatively large volume of current at very low potential through the armature of the motor element.

With the construction shown and described the direct current instrument is applicable for either two-wire or three-wire systems without change, and the alternating current instrument for single phase, two - wire or three-wire, or polyphase circuits. Because of the flotation of the moving systems in mercury as described, a very large upward pressure is obtained which is utilized to carry the weight of the copper sectors 20 which move in the gaps of the damping magnets, and also the weight of the forwardly-extending arms which carry the pen and the ink-well with the connecting and adjusting devices therefor. The parts at the opposite sides of the armature shafts are so designed as to substantially balance each other, and the weight of the two moving systems is made slightly less than the total buoyancy, so that a very light upward pressure on the two upper bearings of the armature shaft results, and consequently the moving systems are very delicate and respond to the slightest variation of the actuating current. The delicacy of the instrument is also increased, as has been pointed out, by using the inset electromagnetic poles and the return - plate within the mercury chamber, thereby reducing the lengths of the air gaps in the magnetic circuit.

The transformers used in connection with alternating current watt meters may conveniently be placed in the fixed portion of the base, back of the removable chart-carrying frame, said portion of the base being hollow, and in the case of direct current instruments having shunt coils on the yokes, suitable small shunts for low capacity meters, or resistance units for voltages up to 550, may be placed in the same position.

It should be understood that while we have described specifically the embodiment of our invention illustrated in the accompanying drawings, the generic claims hereinafter made are not to be restricted to such specific construction, as various modifications may be made without departing from our invention. Furthermore, while we have shown and described our improvements as embodied in a graphic recording instrument they may be applied to any other suitable instrument, and the claims are to be construed accordingly.

That which we claim as our invention, and desire to secure by Letters Patent, is,—

1. A motor element for electrical instruments, comprising a mercury chamber casing having diametrically-opposite slots in the side wall thereof, plates composed of magnetic material fitted in said slots, a magnet having its poles fitted in said slots opposite said plates, and an armature in the mercury chamber.

2. A motor element for electrical instruments, comprising a mercury chamber casing having diametrically-opposite slots in the side wall thereof, plates composed of magnetic material fitted in said slots, a magnet having its poles fitted in said slots opposite said plates, an armature in the mercury chamber, and a return-plate projecting into the mercury chamber.

3. A motor element for electrical instruments, comprising a mercury chamber casing having diametrically-opposite slots in the side wall thereof, plates composed of magnetic material fitted in said slots, a magnet having its poles fitted in said slots opposite said plates, a return-plate projecting into the mercury chamber, and an armature in the mercury chamber between said first-mentioned plates and the return-plate.

4. A motor element for electrical instruments, comprising a mercury chamber casing having diametrically-opposite slots in the side wall thereof, plates composed of magnetic material fitting in said slots, a magnet having its poles fitted in said slots opposite said plates, a return-plate projecting into the mercury chamber, and an armature in the mercury chamber between said first-mentioned plates and the return-plate, said armature having a plurality of slits.

5. A motor element for electrical instruments, comprising a mercury chamber casing open at the bottom, a bracket, a bottom-plate for said casing carried by said bracket, a magnet connected with said bracket and having its poles at opposite sides of the mercury chamber, a return-plate projecting into the mercury chamber casing, and an armature extending between the magnet poles and said return-plate.

6. A motor element for electrical instruments, comprising a mercury chamber casing open at the bottom, a bracket, a bottom-plate for said casing carried by said bracket, a magnet connected with said bracket and having its poles at opposite sides of the mercury chamber, a return-plate carried by the bottom-plate and projecting into the mercury chamber casing, and an armature extending between the magnet poles and said return-plate.

7. A motor element for electrical instruments, comprising a mercury chamber casing open at the bottom, a bracket, a bottom-plate for said casing carried by said bracket, a magnet connected with said bracket and having its poles at opposite sides of the mercury chamber, a return-plate projecting into the mercury chamber casing, an armature extending between the magnet poles and said return-plate, and contacts carried by said bottom-plate and connecting with opposite sides of the mercury chamber.

8. A motor element for electrical instruments, comprising a mercury chamber casing open at the bottom, a bracket, a bottom-plate for said casing carried by said bracket, a magnet connected with said bracket and having its poles at opposite sides of the mercury chamber, a return-plate carried by the bottom-plate and projecting into the mercury chamber casing, an armature extending between the magnet poles and said return-plate, and contacts carried by said bottom-plate and connecting with opposite sides of the mercury chamber.

9. A motor element for electrical instruments, comprising a mercury chamber casing open at the bottom, a bracket, a bottom-plate for said casing carried by said bracket, a magnet composed of separable members supported by said bracket and having its poles at opposite sides of the mercury chamber, a return-plate projecting into the mercury chamber casing, and an armature extending between the magnet poles and said return-plate.

10. A graphic recording instrument, comprising a base, a pair of brackets secured to each other and to the base and insulated from each other and from the base, mercury motor elements mounted on said brackets and comprising vertically-disposed armature shafts, and laterally-swinging pen-supporting devices actuated by said armature shafts.

11. In a graphic recording instrument, the combination with a pair of mercury motor elements, comprising suitable casings having mercury chambers, inverted cup-shaped armatures in said chambers and buoyantly supported by the mercury therein contained, recesses in said casings at opposite sides of said chambers, vertically-disposed armature shafts connected with said armatures, magnets having their poles fitted in said recesses, contacts connecting with the lower portions of said mercury chambers, and return-plates between the poles of said magnets, of bearings for the upper ends of said armature shafts, and laterally-swinging pen-supporting devices carried by said armature shafts, the weight of such pen-supporting devices being less than the total buoyancy, whereby light upward pressure on the upper bearings of said armature shafts is obtained.

12. In a graphic recording instrument, the combination with a pair of mercury motor elements, comprising suitable casings having inverted cup-shaped mercury chambers, armatures in said chambers conforming to the shape of the mercury chambers and buoyantly supported by the mercury therein contained, recesses in said casings at opposite sides of said chambers, vertically-disposed armature shafts connected with said armatures, magnets having their poles fitted in said recesses, contacts connecting with the lower portions of said mercury chambers, and return-plates between the poles of said magnets, of bearings for the upper ends of said armature shafts, and laterally-swinging pen-supporting devices carried by said armature shafts, the weight of such pen-supporting devices being less than the total buoyancy, whereby light upward pressure on the upper bearings of said armature shafts is obtained.

JACOB W. BARD.
OTIS WHITE.